United States Patent [19]

Cook

[11] 4,427,620
[45] Jan. 24, 1984

[54] NUCLEAR REACTOR POWER SUPPLY

[75] Inventor: Bruce M. Cook, Plum Borough, Pa.

[73] Assignee: Westinghouse Electric Corp., Pittsburgh, Pa.

[21] Appl. No.: 231,521

[22] Filed: Feb. 4, 1981

[51] Int. Cl.³ .......................................... G21C 17/00
[52] U.S. Cl. .................................... 376/216; 376/259
[58] Field of Search ............... 376/215, 216, 242, 245, 376/259; 371/11, 36; 364/184, 186

[56] References Cited

U.S. PATENT DOCUMENTS

| 3,265,584 | 8/1966 | Cooper | 376/245 |
|---|---|---|---|
| 3,424,652 | 1/1969 | Oehmann | 376/249 |
| 3,425,903 | 2/1969 | Bevilacqua | 376/215 |
| 3,437,556 | 4/1969 | Bevilacqua | 376/259 |
| 3,483,081 | 12/1969 | Sparks et al. | 376/216 |
| 3,593,307 | 7/1971 | Gouge, Jr. et al. | 364/186 |
| 3,689,802 | 9/1972 | Waldmann | 376/215 |
| 3,888,772 | 6/1975 | Neuner | 376/215 |
| 3,892,954 | 7/1975 | Neuner | 235/153 AC |
| 3,940,309 | 2/1976 | Imperiali | 376/216 |
| 4,054,486 | 10/1977 | Lefebvre et al. | 376/215 |
| 4,105,496 | 8/1978 | Therond | 376/215 |
| 4,200,226 | 4/1980 | Piras | 364/186 |
| 4,282,061 | 8/1981 | Sakurai et al. | 376/242 |
| 4,292,129 | 9/1981 | Barry | 376/217 |
| 4,347,563 | 8/1982 | Paredes et al. | 371/11 |

FOREIGN PATENT DOCUMENTS

| 52-58843 | 5/1977 | Japan | 364/186 |
|---|---|---|---|
| 1108258 | 4/1968 | United Kingdom . | |
| 1506081 | 4/1978 | United Kingdom . | |
| 2040522 | 8/1980 | United Kingdom . | |
| 2041605 | 9/1980 | United Kingdom . | |

OTHER PUBLICATIONS

WCAP-8900, Rev. 1, Westinghouse Model 414, Control System Signal Selection Device, Cook, (8/78).
Westinghouse Model 414 Control System Signal Selection Device, Cook, (2/77).
IEEE Standard: Criteria for Protection Systems for Nuclear Power Generating Stations, Std. 279-1971, pp. 7-11.

Primary Examiner—Sal Cangialosi
Attorney, Agent, or Firm—Daniel C. Abeles

[57] ABSTRACT

The redundant signals from the sensor assemblies measuring the process parameters of a nuclear reactor power supply are transmitted each in its turn to a protection system which operates to actuate the protection apparatus for signals indicating off-process conditions. Each sensor assembly includes a number of like sensors measuring the same parameters. The protection system has a number of separate protection units, each unit receiving the process signals from the like sensors of each assembly in its turn. The sets of process signals derived from the sensor parameter assemblies are each in its turn transmitted from the protection system to the control system which impresses control signals on the reactor or its components to counteract the tendency for conditions to drift off-normal status requiring operation of the protection system. A parameter signal selector is interposed between the protection system and the control system. This selector prevents a parameter signal of a set of signals, which differs from the other parameter signals of the set by more than twice the allowable variation of the sensors which produce the set, from passing to the control system. The connection between the protection units and the selector is four separate fiber optic channels so that electrical interaction between the protection units and the selector or control system is precluded. The selectors include a pair of signal selection units, one unit sending selected process signals to primary control channels and the other sending selected process signals to back-up control channels. Test signals are periodically impressed on a selected pair of a selected unit and control channels. When test signals are so impressed the selected control channel is disabled from transmitting control signals to the reactor and/or its associated components.

16 Claims, 8 Drawing Figures

NUCLEAR REACTOR POWER SUPPLY

REFERENCE TO RELATED DOCUMENTS

IEEE-279-1971, "IEEE Standard Criteria for Protection Systems for Nuclear Power Generating Stations", The Institute of Electrical and Electronic Engineers, Inc., 1971 (herein referred to as IEEE) is incorporated in this application by reference.

BACKGROUND OF THE INVENTION

This invention relates to the supply of electrical power by the conversion of thermal energy derived from a nuclear reactor. It has particular relationship to the sensing, measurement and observation of the parameters of the operational processes of power-supply apparatus serving this purpose and to the protection and connection of the components of such apparatus responsive to the manifestation of off-normal operation or of an off-normal condition of these components. In the following discussion sensing, measurement or observation will in most cases be referred to as measurement. Typically nuclear-reactor power-supply apparatus includes a nuclear reactor and cooperative components. Typically such components include steam or vapor generators, a turbine, an electrical generator driven by the turbine, a condenser, and the necessary heaters and pumps. A liquid coolant flows through the core of the reactor. Where the reactor is of the pressurized-water type, a pressurizer is included among the components cooperative with the reactor and the coolant flows in a primary loop through each steam generator in heat-exchange relationship with feedwater supplied to the steam generator. The feedwater is converted into steam to drive the turbine. Typical operational processes are the generation of nuclear energy by the reactor, the heating by the core of the coolant, the conversion of the feedwater into steam, the flow of steam to the turbine, the flow of feedwater to the steam generator, and the compression of the coolant by the pressurizer. In the pressurized-water reactor, the coolant must be maintained at critical temperature and pressure. Typical parameters which are sensed, measured or observed are power generated by the reactor, the temperature of the coolant, the pressure of the steam and the level of the feedwater in the steam generators, the pressure and the level of the coolant in the pressurizer, the flow; i.e., the time rate of flow, of the feedwater, categorical parameters such as the state of a switch, whether it is open or closed, are also observed in the practice of this invention. The expression "off-normal" as applied to a condition or state in this application means that the condition or state is above or below limits set as indicated by measurement of the applicable parameter.

In the measurement of the parameters, the principle of redundancy is applied. Each parameter is measured by a plurality of like sensors. The signals delivered by the sensors are processed separately. To avoid reaction responsive to spurious signals, at least two signals indicating an off-normal condition must be received for processing. In this application the set of sensors which measure one parameter of a process are referred to as a "sensor assembly" or a "sensor set". The separate sensors of each assembly or set are referred to as "sensor means". The expression "sensor means" is used because in some cases, for example, excore power measurement, the sensor assembly includes groups of several sensors. The overall object of this invention is to evaluate reliably the validity of the individual parameter signals of each set of signals to determine their truth or falsity.

In accordance with the teachings of the prior art a protection system and a control system are provided for responding by appropriate action to the operational-process parameter signals. The protection system causes protective action such as the opening of disconnects, to take place responsive to off-normal signals which have reached a stage demanding such action. The control system responds to parameter signals drifting towards off-normality or the stage demanding protective action by impressing on the reactor or its components commands tending to counteract the drift.

Also in accordance with conventional practice the control system derives certain of its inputs from the process-parameter signals which are impressed on the protective system. This assures that the nuclear reactor and its cooperative components are controlled responsive to the same process measurements as those which serve to protect them. The control system thus functions to maintain margins between operating conditions and process safety limits and to reduce the likelihood of spurious tripping of the protective apparatus.

The control system is designed to maintain normal conditions in the power supply apparatus and thereby maintain the margins to the safety limits. There are however typically two cases where the trip setpoints on the apparatus are variables which are calculated by the protection system and the margins to trip on these setpoints are used directly by the control system as controlled variables. One case of this direct margin control is performed by the control system where the margin to trip on either low departure from nuclear boiling ratio or high KW/ft along the reactor, whichever is smaller, is used to control the reactor axial power distribution into a more balanced condition thereby reducing the power peaking factors and increasing the margin to trip. The DNBR is an indication of the departure of the reactor coolant from critical temperatures and/or pressure. For example if the pressure of the coolant decreases, the coolant may boil. The protective system defines a margin as a function of the demand on the apparatus. If this margin is passed, the power-supply apparatus is shut down. However, as the margin is approached, the control system reacts to increase coolant pressure or reduce coolant temperature or to take other measures. The KW/ft is the thermal power per foot developed along the reactor at the hottest point, i.e., where the core has a tendency to develop a hot spot. This margin is also set by the protective system in dependence upon the demands on the power-supply apparatus. If the margin is breached, the apparatus is shut down by the protection system. However, the control system reacts to prevent the margin from being passed. If either the DNBR or KW/ft is low, action by the control system is demanded.

The DNBR is derived from the nuclear instrumentation; i.e., from the excore detectors and $Q_{N-16}$ power measurement, from the control-rod position, from the cold-leg temperature, and from the pressure of the pressurizer. The KW/ft is derived from the above parameter measurements except the pressure of the pressurizer. The control action is performed by a combination of boron concentration changes and control rod motion, and is taken only when either margin becomes excessively low. The margin signals used for this control function are calculated by the core limits calculations in each protection system.

Another case of direct margin control is performed in conjunction with the dropped-rod protection. If a control rod drops into the core, the control system acts to reset the turbine to lower power. The rod is pulled out by remote actuators. The rod-drop protection function determines a high neutron-flux-trip setpoint, which is less than full power, following a high negative flux-rate event caused by the dropping of one or more control rod assemblies. The setpoint is set by the protection system in dependence upon the power setting of the apparatus. If the neutron flux is too high for the power setting, the protection system shuts down the apparatus. However, when the margin is approached, the control system takes corrective action. Typically the control system acts to reduce the power demand on the apparatus below the setpoint by preventing control rod withdrawal and initiating a turbine runback which is later terminated when the turbine power is below the reactor trip setpoint.

The derivation of the control-system signals through the protection system has the advantage that it reduces the number of redundant measurements required for each process and the overall apparatus complexity at critical boundary penetration. This leads to the reduction in separation requirements within the containment as well as in apparatus cost and maintenance requirements.

To achieve these advantages certain measures must be taken to ensure the independence of the protection and control systems. IEEE-279-1971 (specifically Section 4.7) dictates the criteria which nuclear-reactor power-supply apparatus must meet if protection signals are also used by the control system. In addition to specifying that isolation devices must be provided to guard the protection system against electrical faults in the control system, IEEE-279 contains the following paragraphs which address the functional interaction of the protection and control systems:

"4.7.3 Single Random Failure. Where a single random failure can cause a control system action that results in a generating station condition requiring protective action and can also prevent proper action of a protection system channel designed to protect against the condition, the remaining redundant protection channels shall be capable of providing the protective action even when degraded by a second random failure.

Provisions shall be included so that this requirement can still be met if a channel is bypassed or removed from service for test or maintenance purposes. Acceptable provisions include reducing the required coincidence, defeating the control signals taken from the redundant channels, or initiating a protective action from the bypassed channel."

It is an object of this invention to provide nuclear-reactor power-supply apparatus in which the signal for the control system are derived from the protection system which shall be so structured and shall so operate as to meet this criterion.

In prior art apparatus, this criterion was met by providing two-out-of-four (2/4) logic on protection process signals which were also used for control. That is, four signals for each process parameter were transmitted to the protection system and to the control system. To produce protection or control action two signals indicating off-normal condition or demand for protective action of a process were required. When one channel was taken out of service for test or maintenance, the protective action or actions from that channel were initiated thus causing the logic of the remaining channels to be one out of three (1/3). While operating in the 1/3 mode, the apparatus was exposed to the possibility that a single component failure which may be spurious, will cause an inadvertent trip of the apparatus.

When a protection channel is set for test or maintenance, the operator actuates a switch to disconnect the channel from the input to the constant system. If the operator does not know that the channel is on test, he fails to actuate the switch and maloperation of the apparatus may result.

It is an object of this invention to overcome the above disadvantage of the prior art and to provide nuclear-reactor power-supply apparatus incorporating redundancy in its protection and control but wherein the tendency of inadvertent apparatus trips by a single failure of its process parameter signal channels shall be suppressed.

SUMMARY OF THE INVENTION

In accordance with this invention, when a channel which is in test or maintenance is bypassed, the 2/4 logic for tripping the power-supply apparatus is reverted to 2/3 logic. Paragraph 4.7.3 of IEEE-279 demands that no single failure should cause an adverse control action and prevent appropriate response of the protection channel to protect against the adverse action of the control, for example, as a result of a fault in this protection channel. To meet this criterion a selector or signal-selection means is interposed between each protection channel and the control system for rejecting signals which might lead to the barred action of the control. This signal selection means passes to the control system from each protection channel only those signals which are representative of the actual status of the process under observation, i.e., true signals, rejecting signals which are in error, i.e., false signals. The signal which are measures of each parameter of each process transmitted through the different channels are compared and any signal which differs significantly from the other signals measuring the same parameter are rejected. The significant difference is a magnitude equal to twice the allowable variation of the signals measuring the parameter in question. In accordance with an aspect of this invention, electrical interaction between the protection units of the protection system and the control system is precluded by passing the signals from each unit to the right selection means and the control system through optical means.

The signal-selection means includes a pair of signal-selection units. Each unit includes a computer, typically a microcomputer. All process signals are impressed separately on both units. The control system includes a primary control channel in communication with one selection unit and a secondary control channel in communication with the other unit. Cooperative with the selection units and the control channel there is a test signal unit. At intervals test signals are injected into a selected one of the selection units through a switch. During these intervals the flow of process signals to the selected unit and the flow of process signals to the control channel connected to the selected selection unit is interrupted. The function of the signal-selection means is to render the control system insensitive to single failures in the protection units of the protection system. The measurements derived from the processes and analog signals. An analog-to-digital converter (A/D) is contained within each protection unit and is interposed between the sensor and the signal-selection means to convert these analog signals into digital values. The digital signals measuring the different processes are multiplexed over data links into the selection means and, if the signals are true, into the control system.

BRIEF DESCRIPTION OF THE DRAWINGS

For a better understanding of this invention, both as to its organization and as to its operation, together with additional objects and advantages thereof, reference is made to the following description, taken in connection with the accompanying drawings, in which.

DETAILED DESCRIPTION OF EMBODIMENT

Figure 1:
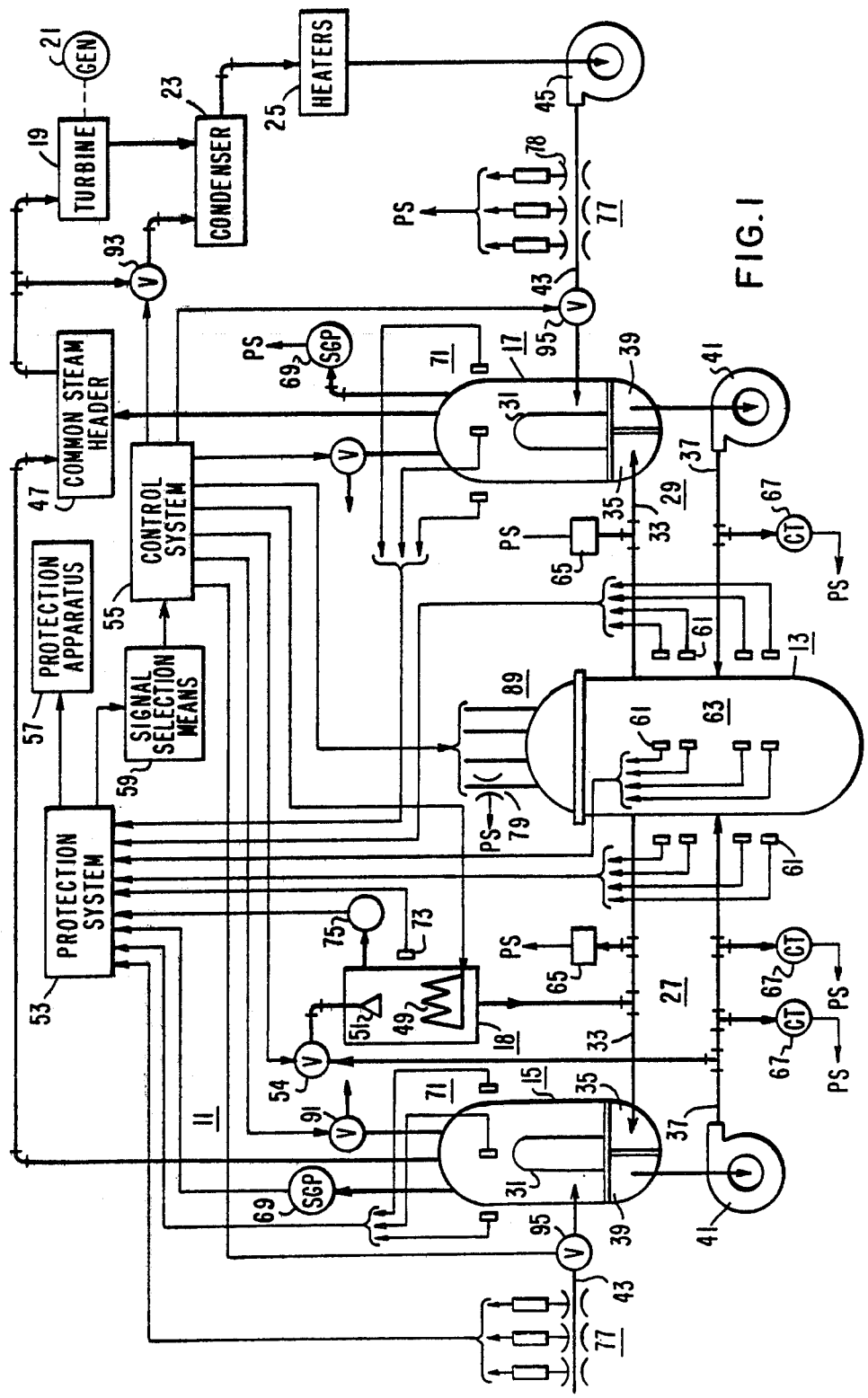
FIG. 1 is a diagrammatic view of nuclear-reactor power-supply apparatus constituting an embodiment of the invention and which serves in the practice of this invention.
Figure 2:
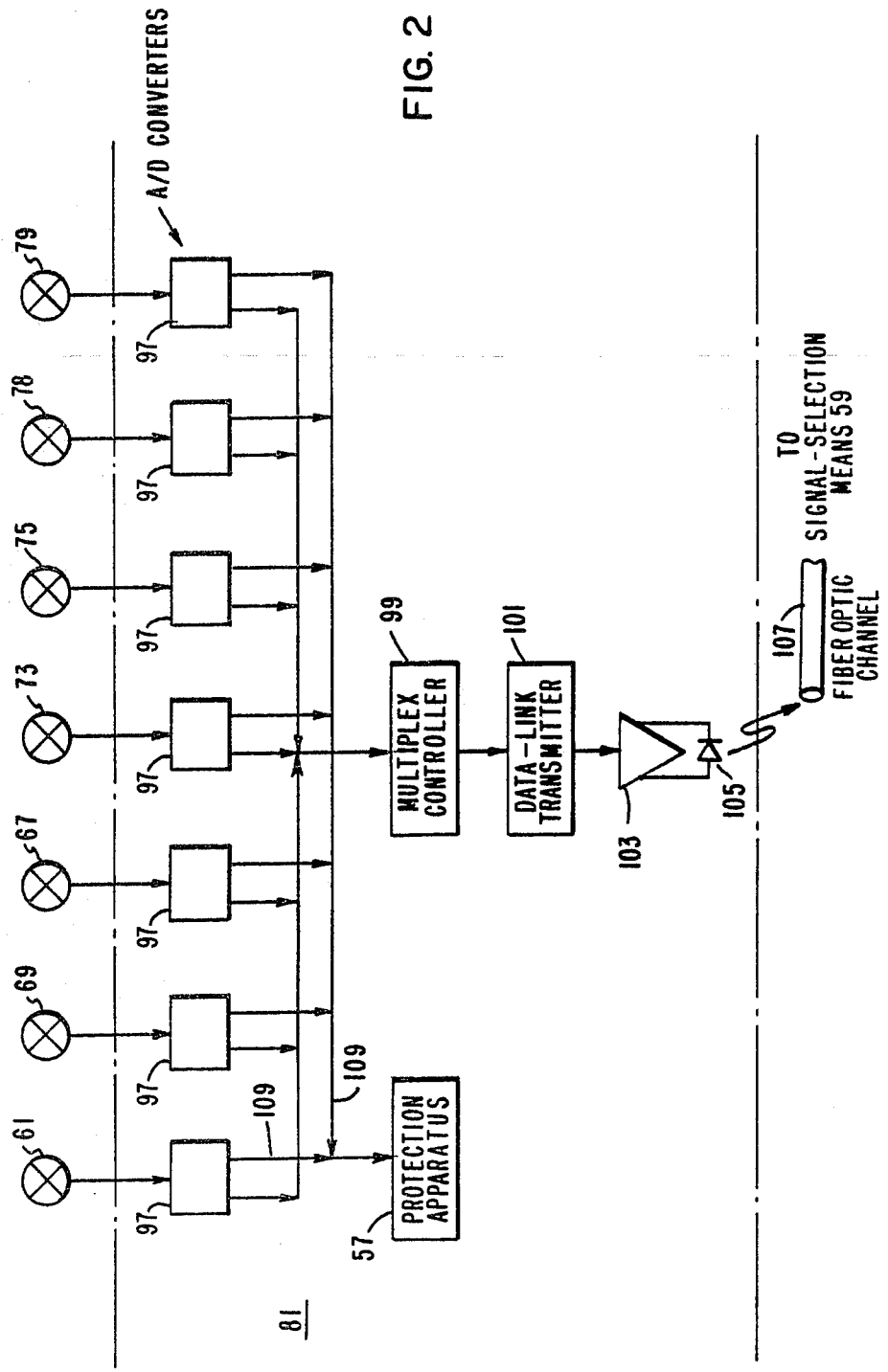
FIG. 2 is a diagrammatic view showing a protection unit of the protection system of the apparatus shown in FIG. 1, its cooperative communication channel and its relationship to the remainder of the apparatus shown in FIG. 1.
Figure 3:
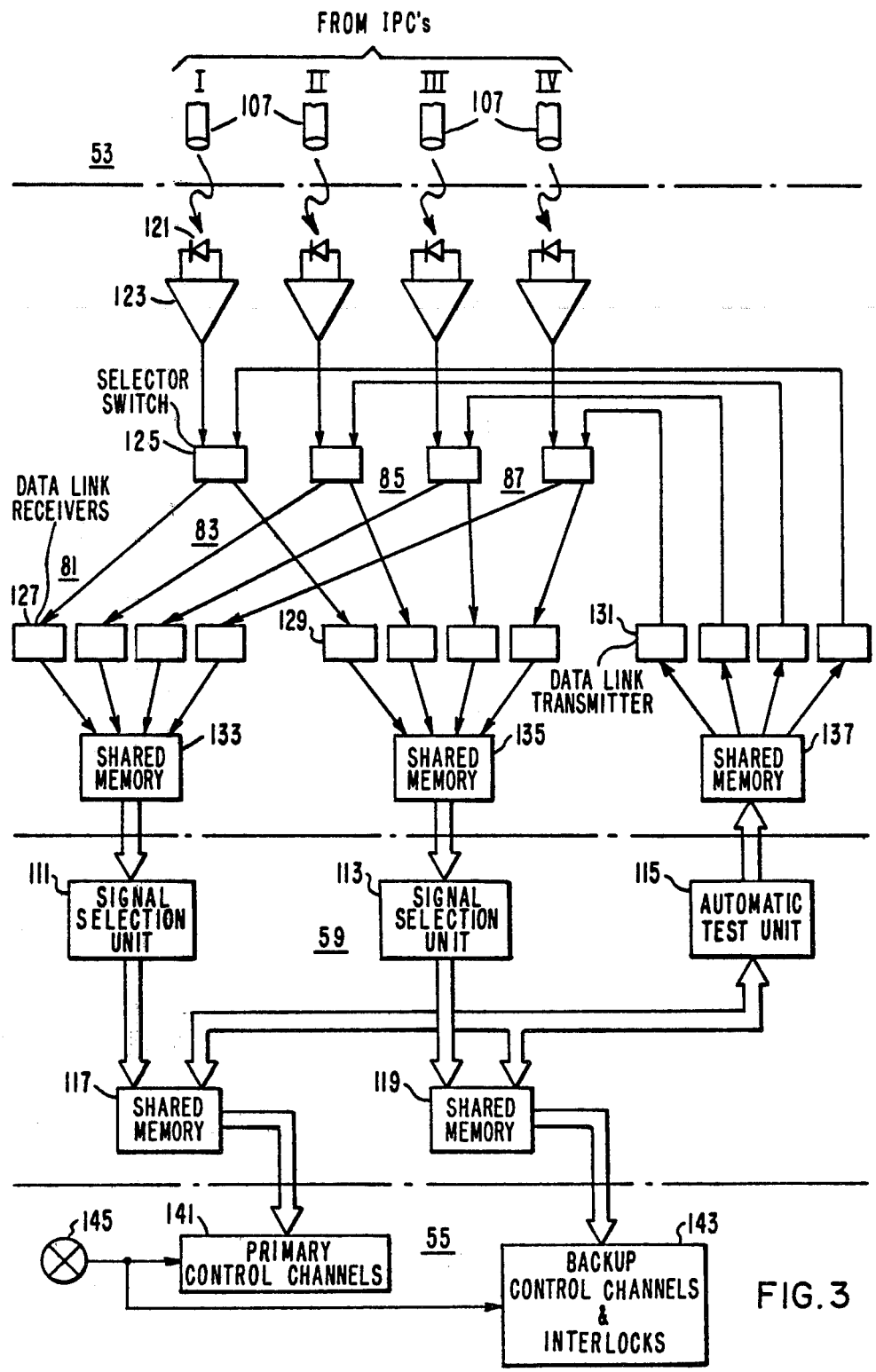
FIG. 3 is a diagrammatic view showing the separate communication channels of the apparatus shown in FIG. 1, the signal-selection means and the control system and the cooperative relationship between these parts.

FIGS. 1 through 3 show nuclear-reactor power-supply apparatus 11 typically of the pressurized-water type. The apparatus 11 includes a nuclear-reactor 13, steam generators 15 and 17, a pressurizer 18, a turbine 19, an electrical generator 21, a condenser 23 and heaters 25 for preheating the condensate from the condenser. While only two steam generators 15 and 17 are shown, there may be more than two and typically there are four. The apparatus 11 includes separate loops 27 and 29 for supplying coolant to the reactor. Each loop 27 and 29 includes the primary tubes 31 of a corresponding steam generator. Each loop 27 and 29 includes a hot leg 33 through which hot coolant is conducted to an inlet plenum 35 of the steam generator. Through the tubes 31, the hot coolant is in heat-exchange relationship with the feedwater supplied to the genrator. Each loop 27 and 29 also includes a cold leg 37 through which the coolant, whose temperature has been reduced by the heat interchange, is returned to the reactor 13 from the outlet plenum 39 of the steam generator. Each loop includes a pump 41 for driving the coolant around the loop. Each steam generator 15 and 17 is also supplied separately, i.e., in separate secondary loops with feedwater from the condenser 23, through heater 25 and feedwater line 43. The feedwater is driven by a pump 45 in each line 43. The steam produced in the steam generators 15 and 17 is supplied to a common header 47. From the header 47 the steam is supplied to drive turbine 19. The pressurizer 18 includes a heater 49 and a spray 51. The spray 51 is supplied with the coolant from the cold leg 37 of loop 27 through a valve 54. The pressurizer 18 supplies coolant to the hot leg 33. The steam generators 15 and 17, the pressurizer 18, the turbine 19, the electrical generator 21, the condenser 23, the heaters 25, the loops 27 and 29, and their associated parts are referred to in this application as the components which together with reactor 13 convert the thermal energy generated in the reactor into electrical energy.

The apparatus 11 also includes a protection system 53 and a control system 55. The protection system 53 is connected to operate protection apparatus 57 such as disconnects, when the apparatus 11 is in a state requiring that it be shut down or disconnected from its network. The control system 55 acts on the processes of the reactor 13 and its cooperative components to correct off-normal conditions which lend themselves to correction. The protection system 53 is connected to the control system 55 through signal-selection means which prevents a signal not representative of the parameter which it measures from being injected into the control system 55.

The operation of the reactor 13 and its cooperative components is monitored by sensor means which measure the parameters of the processes of the reactor and the components and provide signals characterizing the measurements. Each parameter is measured by a plurality of, typically four, with a few exceptions, of like sensor means. As used in this application the expression "sensor means" means one sensor or, as in the case of excore detectors, several sensors which measure or monitor a process parameter. The expression "sensor assembly", or "sensor set" means a group or set of sensor means which measure or monitor this same process parameter. FIG. 1 shows some of the sensor means or the sensor assemblies of which they form a part. In some cases only one or two sensor means is shown to avoid so confusing the drawing that it is not readily readable.

Among the sensor means are the excore detectors 61 which measure the neutron flux. A plurality of sensor means 63 of these detectors 61 are coupled to the reactor 13. Typically there are four detectors 61 in each sensor means disposed along the reactor 13. The four sensor means form a sensor assembly. There are also the nitrogen-16 sensors 65 which measure the reactor power. These sensors are connected to the hot legs 33 of the coolant loops 27 and 29. Typically four sensors 65 forming a sensor assembly are connected to each loop. The parameter measured by sensors 65 is conventionally referred to as $Q_{N-16}$. The sensor means 63 and the sensors 65 are part of the nuclear instrumentation. The cold-leg temperature is measured by sensors 67. There are typically four such sensors in an assembly for each loop 27 and 29. There are also sensors 69 on each steam generators 15 and 27 which measure the pressure and sensor means 71 which measures the feedwater level. Typically there are four of each such sensors 69 and four sensors in sensor assembly 71 for each steam generator. There are sensors 73 which measure the water level in the pressurizer 18 and sensors 75 which measure the pressure in the pressurizer. Typically there are four sensors 73 and 75. There is sensor assembly 77 connected to each feedwater conductor 43 which measure the feedwater flow; typically there are three sensors 78 in assembly 77 for each steam generator 15, 17. There are sensors 79, typically four, for indicating the positions of the control rods. There may be other sensors measuring process parameter or even indicating switch positions.

The sensors 61 through 79 impress their respective process-parameter signals on the protection system 53. In FIG. 1 some of the connections between the sensors and the protection system are represented by lines with arrows directed to the protection system. Others are represented by short lines with arrows labeled "PS".

The protection system 53 includes a plurality of like protection units 81, 83, 85, 87 (FIG. 3) corresponding in number to the maximum number of sensor means, typically four, in each assembly. Each protection unit 81–87 includes, in addition to the channels shown in FIG. 3, channels such as those shown for unit 81 in FIG. 2. FIG. 2 shows the linkage between the sensors or sensor means and the optical channel. FIG. 3 shows the remainder of the protection units. The signals from each of the separate sensors as of the separate sensor means, such as excore sensor means 63, of each assembly, which measure the same process parameter, is impressed on or injected into a separate protection unit. The process parameter signals typically are passed from the protection system 53 to the control system 55 through the signal selection means 59 which filter out unrepresentative signals. The signals derived directly from the sensors are passed to the control system 55, as selected by the signal selection means 59, in the same form as they are received by the signal protection means. Other signals passed to the control system, such as the DNBR and the KW/ft. margins are computed in the protection system 53 from signals derived from the reactor 13 and its cooperative components and the results of the computations are passed to the control system 55 through the signal-selection means 59.

The control system 55 impresses control commands on the reactor and on its cooperative components. Typically the commands are impressed on the control rods 89, the spray valve 54 for the pressurizer 18, the steam relief valves 91 for the steam generators 15 and 17, the steam-dump valve 93 which bypasses the turbine 19, the heater 49 for the pressurizer 18, the feedwater control valves 95 and others.

FIG. 2 shows typically the protection unit 81. Each unit includes a plurality of analog-to-digital converters 97. The signal from each sensor means is impressed on a separate A/D converter 97. Typically the output of one of the sensors 61 of sensor means 63 is impressed on the left-hand converter 97. There are three additional converters (not shown in FIG. 2) for the other three sensors of the set 63. The signal from a steam generator pressure sensor 69 is impressed on the second A/D from the left-hand end, the signal from cold-leg temperature sensor 67 in the next, the signal from the pressurizer level sensor 73 on the next, etc. The digital output of the A/D's are impressed on a multiplex controller 99 which passes each signal in its turn to a data-link transmitter 101. The multiplex controller 99 is typically a microcomputer. The output of transmitter 101 is passed to amplifier 103. The output of amplifier 103 supplies a light emitting diode (LED) 105. Typically a signal from a sensor may be defined by 12 digits, some 1's and some 0's. The light signal emitted by the LED 105 has 12 temporal spaces. Typically when a digit is a 1, a light pulse is emitted during the corresponding space, for a 0 no light pulse is emitted during the corresponding space. The output of the LED 105 is transmitted through a fiber optic channel 107. The outputs of the A/D's 97 are also passed to the protection apparatus 57 as indicated by the arrows 109. The other protection units 83, 85, 87 are similar to the unit 81.

The protection apparatus 57 cannot be operated by a digital signal from only one of the protection units 81–87 even if this signal indicates that operation of the protection apparatus is demanded. To operate the protection apparatus appropriate signals from at least two of the protection units is required.

The signal-selection means (FIG. 3) includes like signal-selection units 111 and 113 and an automatic test unit 115. The units 111, 113 and 115 are microcomputers. Shared memories 117 and 119 are provided for receiving and storing data from the units 111, 113 and 115 for further processing. The data from the separate protection units 81–87 is transmitted to the signal-selection means through separate communication channels. Each channel includes, in addition to the fiber optic 107, a photo diode 121 (or photo transistor), an amplifier 123, an electronic selector switch 125, data-link receivers 127 and 129 and a data-link transmitter 131. The outputs of data-link receivers 127 are stored in identified addresses or address slots in shared memory 133; the outputs of data-link receivers 129 in shared memory 135. The selected output of the automatic test unit 115 is stored in shared memory 137 in identified addresses or slots. Shared memory 137 transmits test signals and appropriate commands to the respective data transmitters 131. Each transmitter 131 transmits its test signal and its command to the switch 125 of the communication channel in which it is connected.

The automatic test unit 115 selects signal-selection unit 111 or 113 for test and generates the test signals. Responsive to a command from the automatic test unit 115, the switches 125 are set to block the flow of process signals to the selected signal-selection unit 111 or 113 as the case may be and to permit test signals to flow into this selected unit. The test signals are stored in the memory 133 or 135 connected to the selected unit 111 or 113. The flow of test signals to the control system is blocked.

The control system 55 includes primary control channels 141 and a backup control channels 143. The primary control channels 141 derive signals from the memory 117 and the backup channels 143 from the memory 119. The backup control channels 143 include interlocks for preventing minor faults from undesirably shutting down the power supply apparatus 11. The primary control channels 141 and the backup control channels 143 are supplied directly from sensors 145 which monitor processes that do not require protection. The channels supply "true" signals to the reactor 13 and its cooperative components for correcting for off-normal conditions which lend themselves to correction. The memories 117, 119, 133, 135 and 137 are direct-access shared memories.

It appears desirable at this point to comment at length on the important features of the invention. The fiber-optic links 107 prevent the propagation of faults in the protection system 53 or the control system 55 from propagating to the control system or the protection system respectively. The links 107 being separate for each unit 81–87 also prevent electrical interaction among these units of the protection system or between channels 141 and 143 of the control system. Only intelligence (information) can pass through a link and only from the protection system 53 to the control system 55. The intelligence sent from the protection system is a block of signal values which are transmitted with a strict protocol which includes a start-of-message code, end-of-message code, byte count, message check sum and parity codes, all of which must be satisfied before the information is admitted to the control system. Failures within the protection system 53 have the potential for causing adverse control actions only if they alter the value of the signals within the data block or interrupt the information flow altogether. In this context, a failed or invalid signal is defined to be one that has been altered from its proper value, i.e., it is no longer representative of the process parameter. The function of the signal-selection means 59 is to identify these invalid signals and prevent them from being passed on to the control system 55. In this multiplexer data system, the signal data is stored in addresses in the memories 133 and 135 of microcomputers. These memories are each periodically updated with new information received on the data links from each protection unit 81 through 87. If the updating process stops for instance, then that data which remains in a memory becomes "stale", i.e., not recent information, however it may in fact continue to represent the true value of the process parameter if the process remains steady. The signal selection means 59 does not rely on any "time lag" methodology to detect stale data (in fact such techniques are used to detect data link failures, but are used also to actuate alarms), rather the stale data is passed on to the control system 55 as long as this data continues to be representative of the process parameter. When the process parameter moves, the functioning data channels track it while the information from a non-functioning channel remains at its fixed value. The signal-selection means then determines that the stale data is no longer representative of the process parameter involved and rejects it, thus preventing the control system from taking any adverse action due to a protection system failure. It is the function of the signal-selection means 59 to reject these signals which are not representative of the process variable, and to pass only valid signals to the control system.

The signal-selection means is typically physically located within the cabinets containing the control system. The reasons for this location are two-fold. First, no single one of the separate protection units has enough information to determine if the electrical signal for a given process parameter is valid. Each signal must be compared with the other signals measuring the same process. To provide the necessary information would require a considerable increase in the amount of inter-channel communication among the protection units if the signal selection unit were located in a protection unit cabinet. This would lead to concerns about the independence of the redundant portions of the protection system. The second reason for locating the signal-selection means in the control system is common mode failure. If the selection means were located in the cabinet or one of the protection units, a single event, such as extreme temperature, could cause the signals processed in that cabinet to be erroneous, while at the same time impairing the ability of the signal-selection means to reject those signals.

It is emphasized that the signal-selection means 59 must be capable of rejecting a single erroneous signal caused by a random failure in the protection system. It must be able to perform this function even when one of the redundant protection units 81–87 is bypassed or removed from service for test or maintenance purposes. Since the signal from a channel in test is in general not representative of the process parameter, the signal-selection means must be capable of rejecting both the signal from the channel in test and another erroneous signal (caused by a protection system failure). This criterion must be met even if the failure and the transition into the test mode occur simultaneously (within the same execution cycle of the algorithm).

The protection system 53 is structured to allow the concurrent bypassing of two out of a set of four channels measuring any given process variable. This is to allow periodic testing of the protection system to continue in the event that one channel is placed out of service for an extended length of time. Although the signal selection means would reject the two bypassed signals, it would be unable to isolate an erroneous signal between the two remaining signals. Thus, in operational modes where two channels of the same protection function are bypassed, any control which is derived from those channels must be placed in the manual mode. This is an administrative action, rather than automatic, however, an alarm is provided to inform the operator that he is entering that mode of operation. During this mode of operation, the coincidence logic of the remaining two channels is automatically reconfigured to one-out-of-two (1/2).

Table I is a list of typical process-parameter signals which are injected in the control system 55 for control of the reactor 13 and its cooperative components.

TABLE I

1. Reactor Inlet Temperature ($T_{cold}$)
2. Power-range measured by excore detectors
3. Reactor Power ($Q_{N-16}$)
4. Margin to Trip on DNBR or KW/ft
5. Steam Generator Water Level (each of typically four loops)
6. Feedwater Flow (each of typically four loops)
7. Pressurizer Pressure
8. Pressurizer Water Level
9. Reactor Power Output of Rod Drop Track/Store Units Derived from power-range excore detectors The signals listed in Table I are derived from sensor assemblies. In the case of steam-generator level and feedwater flow, there is a sensor assembly for each steam-generator loop of which two are shown. The feedwater flow is sensed by three sensors 77 in each loop and the cold-leg temperature by three sensors in each loop.

The excore-detector sensor assembly typically includes four sets 63 of four sensors 61 each. For deriving the other signals each sensor assembly typically includes four sensors. Corresponding sensors of each assembly are connected to the protection units 81–87 except for the feedwater flow sensors which are connected to only three protection units. Corresponding detectors of the four sets of excore detectors are processed as separate items in the corresponding four protection units 81–87.

In other words, each of the signals from each of the set of excore sensor assembly at each level from the lowermost row of detectors to the uppermost row of detectors is compared separately with detectors 61 of other excore means 63 at the same level to determine if any signal is not representative of the parameter.

The signals which are sent to the control system 55 are the outputs of the A/D converters 97 before any calculations are performed. There are a few exceptions. Both the reactor power ($Q_{N\text{-}16}$) and the margin to trip on DNBR or KW/ft signals are not raw sensor signals; rather, they are the result of calculations. Each steam-generator loop is controlled independently by the steam generator water level control. As there are only three feedwater flow sensors 77 in each loop, the algorithm for the signal-selection means 59 is adjusted to operate with only three input signals. No comparison is made between signals which come from sensors 77 in different loops. There is no conflict with paragraph 4.7.3 of IEEE-279, since feedwater flow is used for protection purposes only at low power levels (less than approximately 25% power) where it is not used for control. Since each of the four power-range excore nuclear detectors 63 has four segments (four output signals) it requires special handling in the signal selection means 59.

The reactor cold-leg steam temperature ($T_{cold}$) is actually measured twelve times, three measurements of sensors 67 in each of the four reactor coolant loops 27-29 and two not shown. Only four of these signals will be sent to the control system 55, one from each loop.

Table II identifies those control functions which are performed manually when two channels of the same process parameter signal are concurrently bypassed.

one is assumed to be invalid because it is out of service for test or maintenance or if the apparatus 11 is in N−1 loop operation. The other signal rejected is the result of a single random failure. It is highly unlikely that both of these signals would become invalid in the same computation cycle (less than one second). Thus, the first signal to become invalid would be rejected and due to the "lockout" would no longer be included in the comparison so that the second "failure" can be easily detected as one bad signal out of three, even if it fails to the same value as the previous invalid signal. In the event that the two signals do become invalid in the same computation cycle, then the one which is rejected is the furthest from the average of the four signals computed immediately prior to the event of the signal failures, i.e., the selection algorithm rejects a signal which has moved away from the others in this case. This is consistent with the basis of this invention since at least one of the invalid signals, the one from the out-of-service channel, is known to make a large deviation. The remaining signals including the remaining of the two invalid signals are recompared to determine if additional rejections are required. Each time a signal is rejected, an alarm and annunciator is actuated in the control room to notify the operator of the event so that corrective actions may be initiated.

A key part in the practice of this invention and the compliance of this practice with IEEE-279 is the signal-selection means 59. It is essential that this means be tested at intervals to ensure that it is functioning properly. A test of the selection means is included as a part of the automatic tests performed in the protection units 81-87. During the periodic tests, an injected test signal

TABLE II

| | Manual Control | | | | | | | | |
|---|---|---|---|---|---|---|---|---|---|
| Process Parameter | Rod 89 Control | Boron Control | Loop 1 F.W. Control 95 | Loop 2 F.W. Control 95 | Loop 3 F.W. Control 95 | Loop 4 F.W. Control 95 | Pressurized Heater 49 & Spray 57 | Charging Flow Control | Stem Dump (valve 93) |
| 1. Reactor Cold-Leg Temp. | X | X | | | | | | X | X |
| 2. Excore NIS | X | X | | | | | | | |
| 3. $Q_{N\text{-}16}$ Power | X | X | | | | | | X | X |
| 4. Margin to Trip on Core Limit | X | X | | | | | | | |
| 5a. Loop 1 S.G. Level | | | X | | | | | | |
| 5b. Loop 2 S.G. Level | | | | X | | | | | |
| 5c. Loop 3 S.G. Level | | | | | X | | | | |
| 5d. Loop 4 S.G. Level | | | | | | X | | | |
| 6a. Loop 1 F.W. Flow | | | X | | | | | | |
| 6b. Loop 2 F.W. Flow | | | | X | | | | | |
| 6c. Loop 3 F.W. Flow | | | | | X | | | | |
| 6d. Loop 4 F.W. Flow | | | | | | X | | | |
| 7. Pressurizer Press. | | | | | | | X | | |
| 8. Pressurizer Level | | | | | | | | X | |
| 9. Rod Drop T/S Power* | | | | | | | | | |

*Note: No manual control is provided for turbine runback on dropped rod.

The signal-selection means 59 compares each input signal for a process parameter with the other signals for the same parameter and rejects, i.e., prevents the passing to the control system 55, any signal which differs by a predetermined magnitude, herein referred to as Δ from the other signals. Typically where there are four or, in exceptional cases, three signals, a signal which differs by more than Δ from two other signals from like sensors is rejected. The two signals which are consistent are assumed to be "true" signals. Since, as assumed, four signals are impressed on the protection system 53, two signals may be rejected. The signal selection means 59 has a lockout feature which allows rejection of two signals. Of these two signals which are to be rejected, is substituted, one at a time, for each of the sensor signals; the test signals taking on values spanning the entire sensor range selected. This test signal is not representative of the process variable and disagrees with the other signals for the same parameter and is rejected. If the injected test signal is identified by the same process and part used to identify erroneous signals, the rejection of the test signal constitutes verification of the ability to reject erroneous signals. The microcomputers, the signal selectors 111 and 113 include provisions for observing that each signal, which comes to the signal selection means 59 from a given protection unit 81-87, is rejected at some time during the periodic test of that unit. The results of this verification (whether or not each signal is rejected during the test) is transmitted to the supervising computer (not shown) for the apparatus to become a part of the permanent periodic surveillance record. Proof of the test method can be readily obtained by briefly placing a protection unit 81–87 in the test mode without injecting any test signals. This would cause a "selection malfunction" to be recorded for each of the signals sent from that cabinet, thus demonstrating that true malfunctions are detected during the test.

A second test method that is used is based on the fact that the signal selection means 59 is made up of two signal selectors 111 and 113 which performs all of the signal selections. Since each of these selectors is receiving the same inputs during normal operation, and operating on these inputs with like algorithm, the same results should be manifested. The separate microcomputer 115 that observes the automatic test sequence described above continuously monitors the outputs of the two selectors. If a discrepancy is found in the outputs, an alarm is actuated to notify the operator of the malfunction.

The restriction on operating with the signal selection means when two of the input channels are bypassed places a requirement on the administrative procedures used during testing of the protection system 53. The operator determines which control function, if any, must be placed in manual prior to initiating the automatic test sequence in any of the four protection units.

In addition to the passive tests described above, the automatic test unit 115 provided with the signal selection means 59, upon initiation by the operator, performs tests to verify the proper functioning of the selection algorithm. During these tests simulated process signals are injected by replacing the data links 127 and 129 from the protection units 81–89. The tests demonstrate that single and pairs of signals can be rejected as required. Each redundant selector 111 or 113 is tested separately while the other provides for the automatic apparatus control.

There is a redundancy in the control system 55 which parallels the redundancy in the signal-selection means 59. The primary control channel 141 is serviced by signal selection unit 111 through memory 117 and the back-up control channel 143 is serviced by signal selection unit 113 through memory 119.

Two controls, the power control and the feedwater control, are redundant because they are crucial to apparatus operation and their failure would shut down the power supply apparatus 11. Also the pressurizer level and pressure control have independent interlocks in the control system on key valves to prevent unwanted system depressurizations. The redundancy is provided to enhance apparatus availability. There is no need for physical or electrical separation of the redundant signal-selection units 111 and 113, and they may be located side by side in the same structure or cabinet.

Each of the two signal-selection units 111 and 113 perform the selection for the entire list of process variables presented in Table I. The timing of the data links 101, 127 and 129 and the signal selection means is consistent with the time-response requirement of the fastest control channel, so that valid sensor information is made available to the control system 55 on a "real time" basis. The time response requirements placed on the sensors and their instrument channels by the control system 55 are less stringent than those requirements placed by the protection system 53. The data which is sent from the protection system to the control system is presented to the data link transmitters 101 (FIG. 2) at a rate consistent with the protection system time response. The data link transmitters 101 operating asynchronously with respect to the protection system 53, takes the latest information available for transmission to the control system 53, its speed being dictated by the control system timing requirements. Since the time response requirements of the control system are less stringent than those of the protection system, no additional requirements are imposed on the protection system to provide the signals to the control system.

The practice of this invention will here be described with reference to FIGS. 4–8 which present the subroutine algorithm for processing the signals. It is assumed initially that the switches 125 (FIG. 3) are set to transmit signals measuring process parameters. The signals from the like sensor assemblies are continuously transmitted in sequence assembly by assembly. These signals are stored in addresses in memories 133 and 135 and are updated as they may change. The signal selection units 111 and 113 are programmed to process the signals continuously in sequence assembly by assembly, i.e., the selection units sample the signals. The results of this processing are stored in address memories 117 and 119. These memories are programmed to pass signals representative of the processes involved, i.e., "true" signals, to the primary and backup control channels respectively and to prevent the passage of non-representative or "false" signals. The algorithm (FIGS. 4–8) shows the flow of the signals.

At the beginning of each cycle the signal selection units 111 and 113, in accordance with the algorithm, each takes the number of signals, typically 4, for each parameter, determines which of the signals are valid, and passes the valid signals, along with a number of valid signals and their average into the respective local memories of the units stored in address slots in the memories 117 or 119.

The algorithm is segmented into procedures or subroutines consistent with a structured program implementation. The memories which appear in the algorithm are as follows:

SIG(i) = Value of the $i^{th}$ process parameter signal in a redundant set (of 4)

VALID(i) = Logical variable which is set true if the $i^{th}$ signal is valid

SUM = Sum of valid signals

AVG = Average of valid signals

N(i) = Number of signals which differ from the $i^{th}$ signal by more than $\Delta$ NR = Number of signals which differ from two or more signals which were valid in the previous cycle by more than $\Delta$ NW = Index to an invalid signal DIFF = Difference between two signals DELTA = Acceptable difference between valid signals NC = Number of valid signals CONT(i) = $i^{th}$ valid signal passed on to the control channel Where four signals for each parameter are processed i takes on values from i through 4.

The selection process of the algorithm is described below, the lower case paragraph letters correspond to sub figures of each procedure.

(a) Overall subroutine. This subroutine is presented in FIG. 4. The letter "k" represents the number in the sequence of process parameters which are handled by each signal selection unit 111 and 113. The letter "N" is the total number of process parameters handled. The arrows represent a value assignment operation for the specified variable. For example, "k←1" in the second block 160 means that the value of k is set to 1 and "k←k+1" means that the value of k is set to the current value plus 1.

Figure 5:
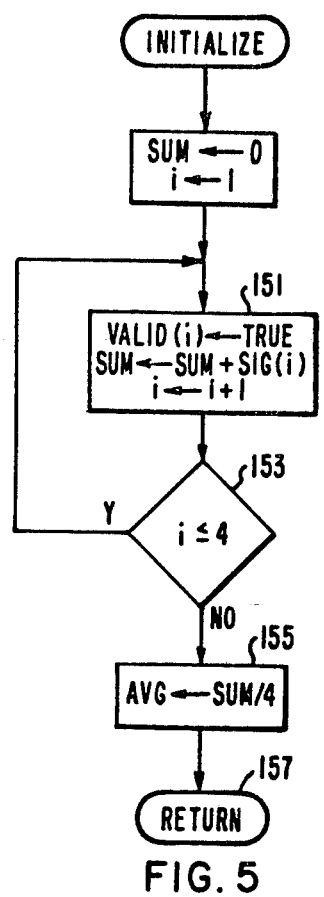
FIG. 5 shows the initializing subroutine for the algorithm for each signal-selection unit governing the carrying out of the initializing procedure for the signals for each process parameter.

(b) Initialize Procedure presented in FIG. 5. In this procedure the variables are initialized by setting all of the valid signal indicators "true", and by setting AVG to the average value of the incoming signals. This initialization is performed in the first cycle following a "Power Up Interrupt", or at the command of a manual push button control located near the selection device. This initialization is performed separately for each set of signals for each process parameter. The letter "i" is the number of a signal in a sequence of signals for the same parameter. A "cycle" refers to an operation during which the set of signals for one process parameter is processed.

Figure 6:
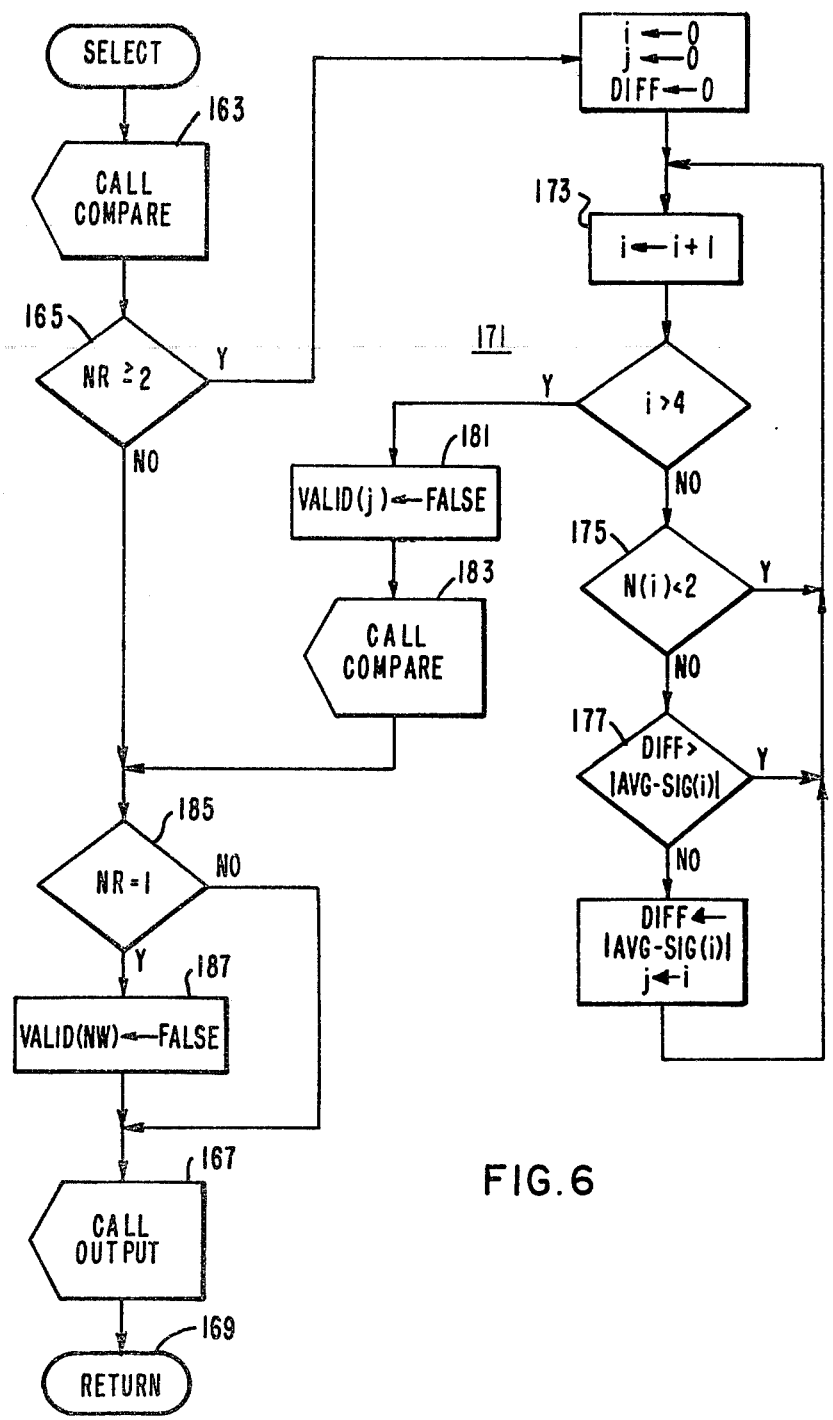
FIG. 6 shows the selection subroutine of the algorithm for each signal-selection unit governing the carrying out of the signal selection procedure.

(c) Select Procedure shown in FIG. 6. This is the main selection program which is called for each new set of signals for the same parameter on every cycle. It calls the compare procedure. If only one of the valid signals is found to differ with two or more of the other valid signals, then the valid signal indicator ($VALID_i$) for that signal is set to FALSE.

If more than one of the valid signals is found to differ from two or more of the other valid signals, each of the differing signals is compared to the average of the valid signals computed in the previous cycle. The signal which differs from the average by the largest magnitude is declared invalid by setting VALID to FALSE. Step 2, and if necessary step 3 or 4, is then repeated to remove the remaining invalid signals. The letter "j" represents the number of the signal which is farthest away from the average.

Figure 7:
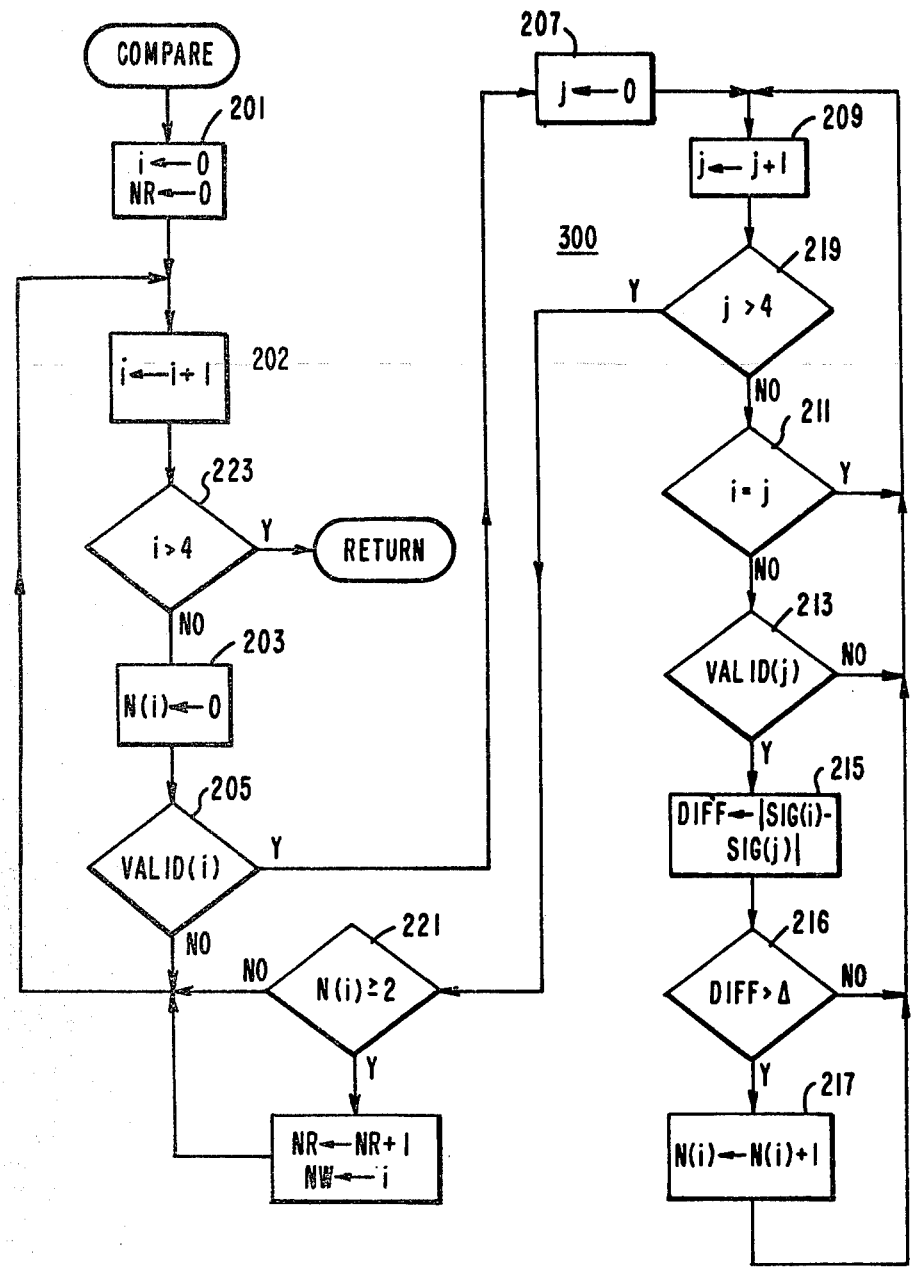
FIG. 7 shows the compare subroutine of the algorithm for each signal-selection unit for carrying out the comparison of each signal measuring a parameter with the other signals measuring the same parameter.

(d) Compare Procedure shown in FIG. 7. In this procedure each valid signal (i.e. valid in the previous cycle) is compared to the other valid signals. A count is kept for each valid signal N(i), of the number of other signals from which it differs by more than $\Delta$.

(e) Output Procedure shown in FIG. 7. After the validity of the signals has been determined, the values of the valid signals are moved to the CONT array. The remainder of the CONT array is filled by repeating other valid signals. The average value of the valid signals is also computed in this step.

If only one signal is invalid, then concurrently with filling the CONT array, the invalid signal is compared to the valid signals. If the difference between the invalid signal and any valid signal is less than $\Delta$, the valid signal indicator for that invalid signal is set to true. However, that signal is not passed on to the control channels 141 and 143 until the following cycle.

The array of valid signal values (CONT), the number of valid signals and the average value of the valid signals is passed to the memories 117 and 119. An alarm is sounded if any signal is rejected during the cycle processed.

Table III illustrates the process carried out by the selective algorithm during a cycle during which signals A, B, C, D from a sensor assembly are processed.

TABLE III

| | Incident | Comparisons* | Not Valid | Valid[ac] |
|---|---|---|---|---|
| 1. | Initially All O.K. | A = B = C = D | | A,B,C,D |
| 2. | A in Test, goes low REMOVE A | A < B, A < C, A < D B = C = D | A | B,C,D |
| 3. | B fails low REMOVE B | B < C, B < D C = D | A,B | C,D |
| 4. | Test complete, A Normal Reinstate A | A = C = D | B | A,C,D |

*equal implies "within $\Delta$ of"

Row 2 in Table III is based on the assumption that the sensor which produces signal A was in test. For test a signal was injected into this sensor which differed from the others by more than $\Delta$. Signal A was rejected. Row 4 is based on the assumption that the test was completed and signal A returned to a representative magnitude.

Figure 8:
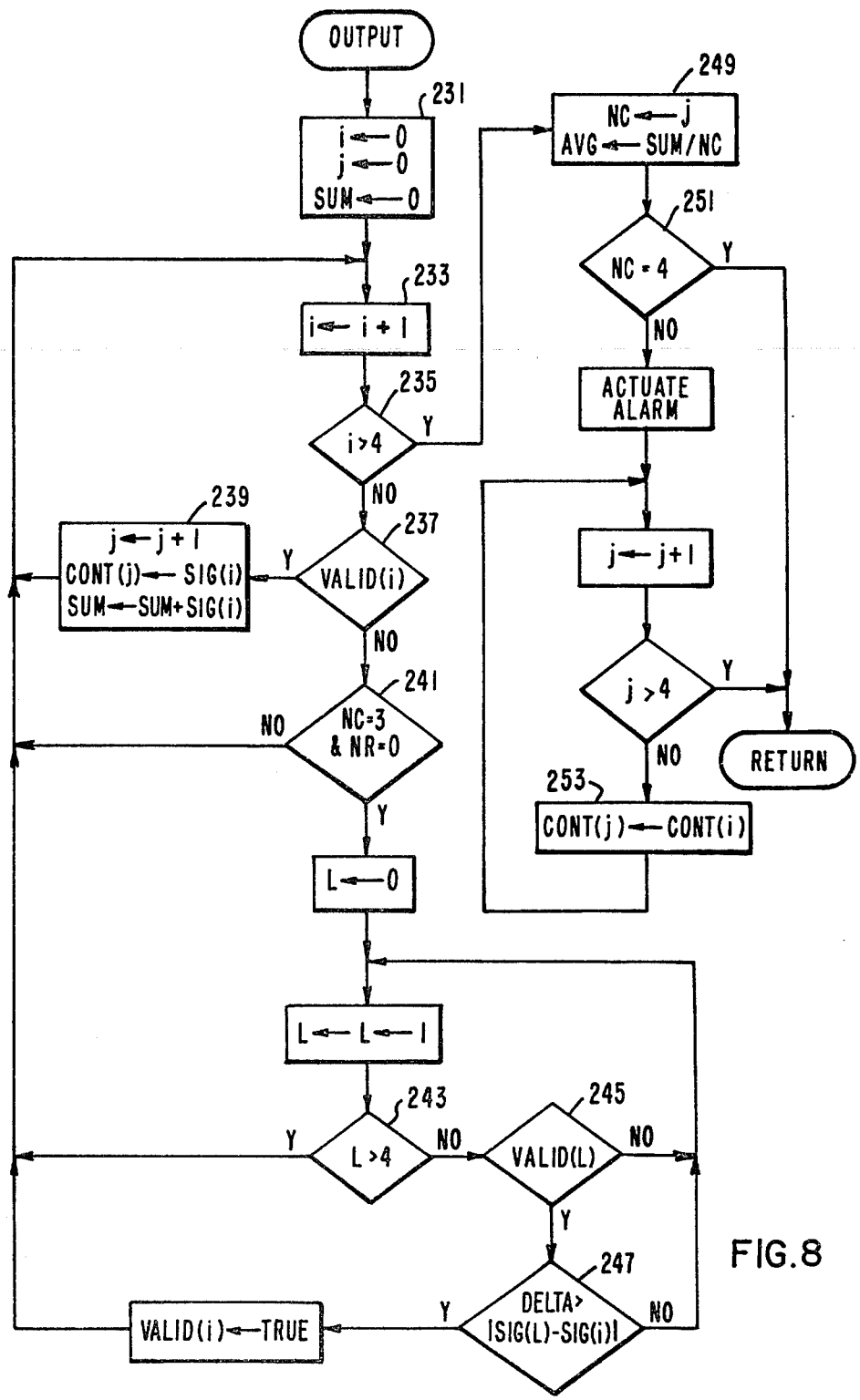
FIG. 8 shows the output subroutine of the algorithm for commanding the output of each signal-selection unit.

The subroutine shown in FIG. 4 will now be described. In the interest of brevity only the operation of memory 133 and signal selection unit 111 will be considered. When the power-supply apparatus 11 is enabled the unit 111 is automatically reset and the data is erased from its local memory. The set of signals indexed i for each sensor assembly indexed k in its turn are entered in succession. As indicated each set of signals is initialized (FIG. 5). During the initializing the average of each set is computed. The sets k are counted. So long as the count of k's is less than N each set is initialized and its average computed and stored in an address in the local memory of the unit 111. When the counts for k's exceeds N the magnitudes of the signals of each set and the initial averages are transmitted in sequence for processing by SELECT subroutine (FIG. 6), COMPARE subroutine (FIG. 7) and OUTPUT subroutine (FIG. 8). The signal sets so processed are counted and when the counts exceed N, the succeeding sets of N signals from the N sensor assemblies are processed. The processing continues so long as the power-supply apparatus 11 is in operation.

The command CALL INITIALIZE WITH SIG(k) is carried out as commanded in accordance with the subroutine shown in FIG. 5 for each set of signals measuring the same parameter.

The signals, identified by numbers or indexes i from 1 through 4 for each sensor assembly, are added as indicated by block 151. When the index i reaches 4 as indicated by decision diamond 153, the sum is averaged as indicated by block 155. The average is stored in the local memory of signal-selection unit 111. After the signals of a set are averaged, the signals for the succeeding set are averaged, as indicated by the oval 157, RETURN, until all sets identified by the numbers k are averaged.

Figure 4:
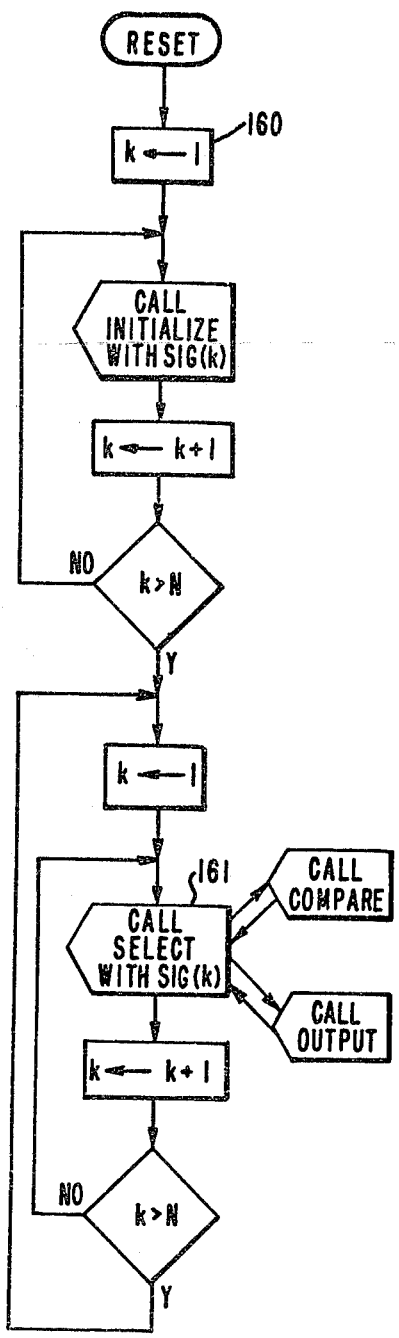
FIG. 4 shows the subroutine of the algorithm for each signal-selection unit for the overall processing of all sets of process-parameter signals.

The command CALL SELECT WITH SIG(k) called for in block 161 of FIG. 4 is carried as commanded by the subroutine shown in FIG. 6 for each set of signals measuring the same parameter; i.e., the signals derived by a sensor assembly. On the command CALL COMPARE at block 163, each signal is compared with the other three. As indicated by the diamond 165, a decision is reached as to how many signals, if any, differ from at least two signals found to be valid in the previous cycle for the signals measuring the same parameter. A signal is valid if it is not rejected. The signals which differ from the signals found to be valid during a previous cycle are identified as NR. If the number of differing signals is less than 2, a decision is made as to whether it is 1. If it is 1, the logical flag VALID is set to "FALSE" for this signal and the OUTPUT subroutine is called as indicated by block 167. If the number of different signals is 0, CALL OUTPUT is commanded directly. The signal selection unit is then commanded to process the set of signals bearing the next highest k as indicated by the oval 169.

If the number of signals which differ from at least two signals found valid during the previous cycle for the same parameter is two or more, the process defined by branch 171 in FIG. 6 is carried out. The difference between each signal and each of the other signals is taken.

The signals are counted as they are compared as indicated by block 173. If after comparisons of an $i^{th}$ signal with the other signals of the set, the number of signals, identified as—N(i), which differ from this signal by less than $\Delta$ is less than 2, as indicated by the y(yes) flowing from diamond 175, no action is taken as to this $i^{th}$ signal and the next signal of the set is processed. The same procedure is followed if, as indicated by the y(yes) flowing from diamond 177, the maximum difference between any two other signals is greater than the absolute magnitude of the difference between the average taken during the preceding cycle and the $i^{th}$ signal. In other words, the $i^{th}$ signal being considered is not the signal which deviates the most of the four signals. Based on the assumption which resulted in the departure of the process to branch 171, there will ultimately be two or more signals for which a "NO" flows from diamond 175 and there will be one signal for which a "NO" flows from diamond 177. This latter one signal is indexed as j and is processed as commanded by block 181. The "VALID" flag for this j signal is changed to "FALSE". Now subroutine COMPARE is called as indicated in block 183. The j signal is processed as commanded in diamond 185 and block 187 and subroutine OUTPUT is called. The signal is flagged by mnemonic NW. If this signal now falls within $\Delta$, NR is not equal to 1, which may happen if it was a test signal for example, the OUTPUT subroutine is called directly.

The reason that the departure from the average during a previous cycle of each of two signals differing by more than $\Delta$ from two others constitutes an interesting aspect of this invention. When two signals differ from the others, it is not known from the instant measurement which are the "true" signals and which are the "false" signals. The absence of the knowledge presents a particularly thorny problem where there are only four redundant signals of a process parameter and two signals depart by more than $\Delta$ from the other two. If the departure is noted for the first time after the signals have been passed through a number of cycles, the false signals are readily identified by their departure of at least one from the average during the previous cycle. If the departure is noted during the first cycle following the initial subroutine, it is reasonable to assume that the average represents a magnitude near the "true" magnitude. A signal which manifests maximum departure from this average may reasonably be assumed to be "false".

The COMPARE subroutine (FIG. 7) is commanded by the SELECT subroutine on two occassions during each cycle: once at the start of the SELECT subroutine (block 163 FIG. 6) and again after a signal, of two signals whose departure from the average during the previous cycle is maximum (block 183), is identified.

In each case the index i and the mnemonic NR are set to 0 as indicated in block 201 and N(i) is set to 0 for each signal of a set as indicated in block 203. Each of the signals identified by index i are processed in turn by incrementing the index as indicated in block 202. If a signal index i is identified as valid as indicated in diamond 205, it is compared, as indicated in branch 300, to the other signals of the same set indexed as j. Initially j is set to 0 as indicated in block 207. Then the j's are incremented as indicated in block 209. When the same signal bears the indexes i and j as indicated in diamond 211 no further action is taken as indicated by the "Y" from diamond 211 and the signal indexed i is compared to the next j. If this next signal indexed j is not valid, no further action is taken as indicated by the "NO" flowing from diamond 213. If this next signal j is valid, the difference between the signal indexed i and the next signal is j computed as indicated by the block 215. If this difference is not greater than $\Delta$, no further action is taken as indicated by the "NO" flowing from diamond 217. If the difference is greater than $\Delta$, N(i) is incremented by 1 as indicated in block 217.

That a signal indexed i has been compared to all three other signals indexed j as indicated by the "Y" flowing from diamond 219. Diamond 221 indicates that a decision is made as to whether there are at this point; i.e., with the i signal just examined, two or more signals which differ from valid signals by more than $\Delta$. If there are not as indicated by the "NO" flowing from diamond 221, no further action is taken and the next signal indexed i is examined. If these are, as indicated by the "Y", flowing from 221, the mnemonic NR is incremented by 1 and the mnemonic NW is set for the $i^{th}$ signal examined.

If subroutine COMPARE is called, as indicated on block 183 (FIG. 6), after a signal has been set to "false", a "NO" flows from diamond 205 and no further action is taken. The remaining signals, typically three in number, are compared with the signals indexed j as disclosed above. After all i signals have been processed as indicated by "i<4" in diamond 223, the processing is returned to SELECT subroutine at the step following the command COMPARE.

The OUTPUT subroutine is commanded by block 167 of SELECT. As indicated on block 231 indexes i and j and the sum are set to 0. As indicated by block 233 the signals indexed i are counted. As indicated by "NO" from flowing from diamond 235 so long as i has not reached 4, a decision as to validity of each signal is made as indicated by diamond 237. If the signal is valid, it is conditioned to be transmitted through the control channels 141 (or 143) as indicated in block 239. For this purpose it is stored in an address slot in memory 117 (or 119). The mnemonic CONT (j) means that the valid signals indexed i are stored in address slots in the order in which they are passed. For example, if the first signal is "FALSE" and the second is valid, the second would be stored in the first address slot. There would then be at least one empty address slot after all signals for a process parameter have been processed. This address slot is filled with one of the valid signals so as to assure that the control channels will act only on up-to-date valid signals. As indicated in block 239 the sum is taken of the valid signals indexed i.

If a signal indexed i is not valid, a decision, indicated in diamond 241, is made as to whether NC=3 (number of valid signals=3) and NR=0. NR is the number of signals which were valid in the previous cycle and which, in the instant cycle, depart by more than Δ from two or more signals. If the decision is "NO", no further action is taken and the next signal is processed. If the decision is (Y), the instant signal is compared to the other signals which are indexed as L.

A decision is made as to whether an instant $L^{th}$ signal is valid as indicated by diamond 245. If this $L^{th}$ signal is not valid, no further action is taken and the instant $i^{th}$ signal is compared with the next $L^{th}$ signal. If the $L^{th}$ signal is valid, a decision is made as indicated by diamond 247, as to whether Δ is greater than the absolute difference of the $L^{th}$ signal and the $i^{th}$ signal. If the decision is "YES", VALID (i), the logical flag of the $i^{th}$ signal is set to "TRUE".

Signals identified as "VALID" at the start of a cycle are subject to being invalidated and declared "FALSE" during processing. A signal which has been tested and has regained its validity is temporarily identified as "VALID" for the following cycle. This signal may be identified as "VALID" or "FALSE" depending on what the result of examining this signal is in the following cycle.

After all signals of a set have been processed as indicated by "Y" flowing from diamond 235, the number of valid signals NC is set to the value of j and the average of the valid signals is computed as indicated on block 249. The average is stored in the local memory of signal selection unit 111 (or 113) for use during the succeeding cycle.

If NC=4, the output subroutine is completed and the operation returns to the overall subroutine for processing of the next set of parameter signals. If NC is not equal to 4 as indicated by the "NO" flowing from diamond 251, the alarm is actuated and a 1 is added to the j identifying the next address slot in the memory 117 (or 119). If j is less than 4, the $i^{th}$ signal which was inserted in a prior address slot is also inserted in the address slot now indexed j. This is indicated in block 253. If j has reached 4 at this time, the RETURN command is entered and the next-in-order parameter signals are processed. If j is not 4, another valid $i^{th}$ signal which is entered in a prior address slot in memory 117 may be entered in a succeeding empty slot.

The algorithm just described is the general case which holds for nearly all of the process parameters which are passed from the protection system to control. There are, at least, two exceptions. First, the feedwater flow in each loop is only measured by three sensors. Therefore, the algorithm must be adjusted to account for three input signals instead of four by adjusting the end points of each loop within the algorithm. In this case, the algorithm is set able to reject either a failed signal or a test signal, but not both. This is not a concern, because the protection achieved with the feedwater flow signal is only active at low power levels, where the signal is not used for control. The other exception is the excore nuclear power signals. In this case, each of the four input signals is actually a "vector" of four signals itself. To handle this, the following changes are made to the basic algorithm:

1. When a "signal" is rejected (VALID$_i$ set to FALSE) in the basic algorithm, the entire vector for that input is rejected in the revised algorithm.
2. The difference between any two vectors (to be compared with Δ) is defined as the maximum absolute difference between any two corresponding elements of the "vectors", i.e.:

$$\text{DIFF} = \max_{i=1,2,3,4} |a_i - b_i|$$

where $a_i$ and $b_i$ are the elements for vectors A and B respectively. What this means is that the signal from each sensor 61 (FIG. 1) of sensor means 63 is compared with signals from corresponding sensors 61, in similar positions along the reactor 13, and the difference adopted is the maximum difference.

3. The average of the valid signals is defined to be the "vector" whose elements are equal to the average of the corresponding elements of the valid signal "vectors".

The signal selection algorithm is based on the rejection of a signal which differs from the other signals by more than a fixed magnitude, Δ. Although the function commanded by the selection algorithm is to reject signals, it is important that this selection algorithm does not reject signals spuriously, i.e., signals which are within their specified accuracy of the proper value. The reason for this is two-fold. First, spurious signal rejections would lead to unnecessary actuations of the control room annunciator, which produces both a nuisance and the concern that, if they occur too often, a real alarm may be missed by the operator. The second reason is more important. Where there are only four signals on each parameter set, the selection algorithm (FIGS. 4–8) is incapable of rejecting an erroneous signal if only two signals remain in the valid set when the signal fails. Since the removal of one signal from the valid set if a signal is taken out of service due to a sensor failure is a design condition, the assumption that only three signals are available at the time of a signal failure is made for any safety analyses. If, when only three signals are available, a valid signal were spuriously rejected, only two signals would remain in the valid set, and the selection algorithm would be incapable of rejecting a truly erroneous signal. Thus, the probability of spurious signal rejection becomes the major contributor to the probability that the selection algorithm does not perform its intended task. Therefore, when determining the value of Δ, the goal is to minimize the probability of spurious rejection.

Each of the signals to be processed by the commands of the selection algorithm has a band of allowable variations associated with it. This band, which contains allowances for channel accuracy as well as spatial process variation, defines the range of magnitudes a signal could have and still be considered not in error. For example, the excore neutron flux measurements may vary by 2% by reason of azimuthal power tilts in the core, and an additional 2% by reason of calibration error. Both channel error (accuracy) and spatial variations are limited by plant surveillance requirements which are contained in the technical specifications of the apparatus 11. It is possible that one signal could be at the lower bound of this range while another is at the upper bound, thus giving a maximum possible difference between two valid signals of two times the allowable variation band of the signals. Therefore, to ensure that a signal which is valid, i.e., within its specified band of the true value, is not spuriously rejected, it is necessary to set Δ equal to two times the allowable variation band. Note that each of the functions listed in Table I has its own value of Δ; for instance, if a temperature channel has a specified accuracy of ±2° F. with no allowance for spatial variations, then Δ for that channel is 4° F.

Having determined the magnitude of Δ based on the elmination of spurious signal rejections, it is necessary to evaluate the effects of not rejecting an invalid signal that has drifted away from the true value by more than its specified limit. In the worst case, a drifting signal could be as far away from the true value as $\Delta+X$, where X is the channel accuracy before it is at least Δ away from two or more valid signals which are within $\pm X$ of the true value. The control systems which use the signals processed in accordance with the selection algorithm, use them in different ways and the effect of the drifting signal on these systems is considered separately. Some of the elements of the control systems 55, such as the axial offset control portion of the power control parameters, take the set of valid signals received as commanded by the selection algorithm and from this set select the one signal that is more conservative in the safety sense. The only way the hypothetical drifing signal can affect this type of control system is if it is drifing in a conservative direction which implies that the control action moves the process away from its protection limits. Hence, there is no potential for interaction of the control and protection systems. Those control systems which do not select the most conservative magnitude use the average of the valid signals received as commanded by the signal selection algorithm. This is necessary for variables where either the highest or lowest signal could be conservative dependent on the mode of operation or the particular magnitude of the parameter, for example, steam generator water level. In these cases, the drifing signal could drive the average of the signals in an unconservative direction. The maximum error in the average occurs if all of the valid signals are stacked up at one end of their allowable band and the drifing signal is Δ away from these signals. In the case where three signals are available prior to the start of the signal drift, the maximum error in the average is 1.67 times the allowable variation band. When four signals are involved, the maximum error is 1.50 times the allowable band. In neither case would a drift of such a small magnitude cause a control transient which would lead to a plant condition which requires protective action. Again, there is no potential for interaction of the protection and control systems. Therefore, the magnitude of Δ has been determined to be two times the allowable variation band, which has been shown to be consistent with the requirements of IEEE-279.

While preferred embodiments of this invention have been disclosed herein, many modifications thereof are feasible. This invention should not be restricted except insofar as is necessitated by the spirit of the prior art.

I claim:

1. Apparatus for supplying electrical power including a nuclear reactor, a plurality of components, connected to said reactor, for converting the thermal energy generated by said reactor into electrical power, a plurality of sensor assemblies, connected to said reactor and to certain of said components, for sensing the process parameters of said reactor and of said certain components, each of said sensor assemblies including a plurality of like sensor means for sensing the process parameter which the sensor assembly of which said like sensor means is a part is to sense, each of said like sensor means producing signals measuring the parameter sensed by said each of said sensor assemblies, a protection system including a plurality of like protection units, means, connecting a like sensor means of each sensor assembly to a corresponding protection unit, to impress on said protection unit the signal produced by said connected sensor means, protection apparatus, responsive to said protection system to produce an apparatus-protection operation only when more than one of said protection units receive signals from their corresponding sensor means indicating faulty operation of said reactor and/or of said certain components whose process parameters are sensed by said corresponding sensor means, a control system, means connecting said control system in controlling relationship with said reactor and with at least some of said certain components, a plurality of separate channels connected separately to each said protection unit and to said control system, for transmitting, to said control system, signals derived by each of said protection units from its corresponding sensor means, for actuating said control system to control the processes of said reactor and/or said components as aforesaid on the indication by said signals impressed on said control system of off-normal operation of said reactor and/or said components, each of said channels including optical means only to transmit the signals from its corresponding protection unit to said control system and to prevent electrical interaction between said protection units and said control system, and signal-selection means, interposed between said channels and said control system, operating by the comparison of each signal from the sensor means of a sensor assembly with the other signals from the sensor means of said assembly, each in its turn, and responsive to such comparison preventing the transmission, to said control system from said protection units, of signals from a sensor means of a sensor assembly which signals differ significantly from signals from like sensor means of the same sensor assembly.

2. The apparatus of claim 1 including testing means, operable at intervals, to substitute a test signal for a process signal from each sensor means in its turn of each sensor assembly, in its turn, said test signal differing significantly from the process signals from the sensor means, of said each assembly so that the transmission of said test signal to the control system is prevented.

3. The apparatus of claim 1 wherein the control system includes primary control channels and backup control channels and wherein the transmission preventing means includes first and second signal-selection units, the first unit controlling the conduction of the flow of sensor signals to said primary control channels and the second signal selection means controlling the conduction of the flow of sensor signals to said backup control channels, the said apparatus also including testing means operable at intervals to substitute a test signal for a process signal from a sensor means each in its turn of a sensor assembly each in its turn, the said apparatus also including switch means, operable in the substitution of a test signal, to block the flow of process signals to a selected one, the first or second, of said signal-selection unit, and to permit the flow of process signals to the unselected one of said units.

4. The apparatus of claim 1 wherein the signal-selection means includes means for determining the differences between each signal sensed by each sensor means and the signals sensed by the other like sensor means of a sensor assembly and also includes means, responsive to said difference-determining means, for rejecting signals of said each sensor means which differ from signals of said other like sensor means by at least a predetermined magnitude, said predetermined magnitude being equal to twice the allowable variation of the signal sensed by said like sensor means.

5. Apparatus for supplying electrical power including a nuclear reactor, a plurality of components, connected to said reactor, for converting the thermal energy generated by said reactor into electrical power, a plurality of sensor assemblies, connected to said reactor and to certain of said components, for sensing the process parameters of said reactor and of said certain components, each of said sensor assemblies including a plurality of like sensor means, each sensor means for sensing the process parameter, which the sensor assembly of which said like sensor means is a part, is to sense, said each of said like sensor means producing signals measuring the process parameter sensed by said each of said sensor assemblies, a protection system including a plurality of like protection units, means connecting a like sensor means of each sensor assembly to a corresponding protection unit to impress on said protection unit the signal produced by said connected sensor means, protection apparatus, responsive to said protection system, to produce an apparatus-protection operation only when more than one of said protection units receive signals from their corresponding sensor means indicating faulty operation of said reactor and/or of said certain components whose process parameters are sensed by said corresponding sensor means, a control system, means connecting said control system in controlling relationship with said reactor and with at least some of said certain components, a plurality of separate communication channels, connected separately between each said protection unit and said control system, for transmitting to said control system signals, derived by each of said protection units from its corresponding sensor means, for actuating said control system to control said reactor and/or said components as aforesaid, and signal-selection means, interposed between said channels and said control system, for preventing transmission, to said control system from said protection means, of signals from a sensor means of a sensor assembly which signals differ significantly from signals from like sensor means of the same sensor assembly, and permitting the transmission to said control system of signals from the sensor means of said sensor assembly which do not differ significantly from signals from other sensor means of said sensor assembly, said signal selection means including means for determining the difference between each signal sensed by a sensor means of a sensor assembly and the signals sensed by the other sensor means of the same sensor assembly, and also including means responsive to said difference-determining means, for rejecting signals of said each sensor means which differ from signals from said other like sensor means of the same assembly by at least a predetermined magnitude, said predetermined magnitude being equal to twice the allowable variation of the signal sensed by said like sensor means.

6. The method of operating apparatus for supplying electrical power, said apparatus including a nuclear reactor and a plurality of components connected to said reactor for converting the thermal energy generated by said reactor into electrical power, said reactor and certain of said components having parameters depending on their operational processes, a protection system, protection apparatus, responsive to said protection system, for producing a protection operation when said process-dependent parameters indicate off-normal operation of said apparatus exceeding a predetermined margin, and a control system for controlling said apparatus responsive to the magnitude of said process-dependent parameters, the said method comprising producing sets each of a plurality of process signals, each set measuring one of said parameters, transmitting each of said sets of process signals to said protection system for separate processing by said protection system, causing said protection system to actuate said protective apparatus responsive only to more than one process signal of a set measuring a parameter indicating off-normal operation of the apparatus, separately deriving from said protection system each set of process signals measuring each of said parameters, determining the differences between each process signal of a set measuring a parameter so derived and the other process signals of the set so derived measuring the same parameter, suppressing any of said last-named derived process signals which differ for each set from the other of said last-named process signals of the same set by at least a predetermined magnitude which is equal to twice the allowable variation of the said derived process signals of said set, transmitting the remaining of said derived process signals of each set to said control system, and causing said control system, responsive to any derived process signal which it receives and which measures off-normal condition of a process within said margin, to control the reactor or component involved in said off-normal process so as to revert said process to normal condition.

7. The method of claim 6 including at intervals substituting a test signal for a process signal from each sensor means in its turn from certain of said sensor assemblies, each assembly in its turn, said test signal differing significantly from the process signals from the sensor means, of said each assembly, so that the transmission of said test signal to the control system is prevented.

8. The method of claim 6 wherein the control system includes primary control channels and secondary control channels and the apparatus includes first and second signal selection units, the first unit controlling the conduction of sensor signals to said primary channels and the second unit controlling the conduction of sensor signals to said backup control channels, the said method including substituting a test signal for a signal from sensor means, each in its turn, of certain of said sensor assemblies, each assembly in its turn, causing said test signal to flow to a selected one, the first or the second, of said signal-selection units, and preventing the flow of said test signal to the unselected one of said signal-selection units while permitting the flow of process signals to said unselected signal-selection unit, said selected signal-selection unit preventing the flow of said test signal to the control channels to which it is connected.

9. Apparatus for supplying electrical power including a nuclear reactor, a plurality of components, connected to said reactor, for converting the thermal energy generated by said reactor into electrical power, a plurality of sensor assemblies, connected to said reactor and to certain of said components, for sensing the process parameters of said reactor and of said certain components, each of said sensor assemblies including a plurality of like sensor means, each sensor means for sensing the process parameter which the sensor assembly of which said like sensor means is a part is to sense, said each of said like sensor means producing signals measuring the process parameter sensed by said each of said sensor assemblies, a protection system including a plurality of like protection units, means connecting a like sensor means of each sensor assembly to a corresponding protection unit to impress on said protection unit the signal produced by said connected sensor means, protection apparatus, responsive to said protection system, to produce an apparatus-protection operation only when more than one of said protection units receive signals from their corresponding sensor means indicating faulty operation of said reactor and/or of said certain components whose process parameters are sensed by said corresponding sensor means, a control system, said control system including a primary control channel and a backup control channel for connecting said control system in controlling relationship with said reactor and with at least some of said certain components, a plurality of separate communication channels, connected separately between each said protection unit and said control system, for transmitting to said control system signals, derived by each of said protection units from its corresponding sensor means, for actuating said control system to control said reactor and/or said components as aforesaid, and signal-selection means, interposed between said channels and said control system, for preventing transmission, to said control system from said protection means, of signals from a sensor means of a sensor assembly which signals differ significantly from signals from like sensor means of the same sensor assembly, and permitting the transmission to said control system of signals from the sensor means of said sensor assembly which signals do not differ significantly from signals from other sensor means of said sensor assembly, said signal-selection means including means for determining the difference between each signal sensed by a sensor means of a sensor assembly and the signals sensed by the other sensor means of the same sensor assembly, and also including means responsive to said difference-determining means, for rejecting signals of said each sensor means which signals differ from signals from said other like sensor means of the same assembly by at least a predetermined magnitude, said signal-selection means including a first signal-selection unit and a second like signal-selection unit, said first signal-selection unit being connected to said primary control channel to prevent and permit, as aforesaid, the transmission of signals from said sensor means to said primary control channel and said second selection unit being connected to said backup control channel to prevent and permit, as aforesaid, the transmission of signals from said sensor means to said backup control channel, test signal-generating means, means connecting said test-signal-generating means to said said channels, said connecting means including selective switching means for connecting said test-signal-generating means in test-signal-transmission relationship selectively with said first signal-selection unit and with the primary control channel or with said second signal-selection unit and with the backup control channel and for preventing the transmission of signals from said sensor assemblies through the selected first or second signal-selection unit, as the case may be, and means, interconnecting said test-signal-generating means and said primary and backup control channels, to prevent the transmission of controlling intelligence to said reactor and/or said components from the selected primary control channel or secondary control channel, as the case may be, during the transmission of a test signal.

10. The method of operating apparatus for supplying electrical power, said apparatus including a nuclear reactor and a plurality of components connected to said reactor for converting the thermal energy generated by said reactor into electrical power, said reactor and certain of said components having parameters depending on their operational processes, a protection system, protection apparatus, responsive to said protection system, for producing a protection operation when said process-dependent parameters indicate off-normal operation of said apparatus, and a control system for controlling said apparatus responsive to the magnitude of said process-dependent parameters, said control system having primary control channels and backup control channels, the said method comprising producing sets each of a plurality of process signals, each set measuring one of said parameters, transmitting each of said sets of process signals in its turn to said protection system for separate processing by said protection system, causing said protection system to actuate said protection apparatus responsive only to more than one process signal of a set measuring a parameter indicating off-normal operation of the apparatus beyond a margin, separately deriving from said protection system each set of process signals measuring each of said parameters, transmitting the sets of process signals so derived through a first signal channel and a second signal channel, for each said channel determining the differences between each process signal of a set measuring a parameter so derived and the other process signals of the set so derived measuring the same parameter, from each channel, suppressing any of said last-named derived process signals which differ from the other of said last-named process signals by a significant magnitude, passing the remaining of said derived process signals of each set transmitted through the first signal channel to the primary control channel, also passing the remaining of said derived process signals of each set transmitted through the second signal channel to the backup control channel, at intervals injecting test signals selectively into said first signal channel or said second signal, passing test signals selectively injected into said first signal channel only to said primary control channel and passing the test signals selectively injected into said second signal channel only to said backup control channel, during the passing of test signals disabling the selected primary control channel or selected backup control channel, as the case may be, from passing process signals, and causing said control system, or during test intervals the non-selected primary or backup control channel, as the case may be, responsive to any derived process signal which it receives and which measures off-normal condition of a process and/or a component not beyond said margin, to control the reactor or component involved in said off-normal process so as to revert said process to normal condition.

11. The method of controlling nuclear-reactor power-supply apparatus including a plurality of sensor assemblies for monitoring each of a plurality of process parameters of said apparatus, each of said assemblies including a plurality of like sensor means, the said method including the following steps:
(a) during successive cycles deriving separate signals indicating the magnitude sensed by each sensor means of successive assemblies, for each assembly in its turn,
(b) determining the average of the magnitudes of the signals sensed by said last-named sensor means of each assembly in its turn during each cycle,
(c) comparing the magnitude of each signal sensed by said sensor means during said each cycle with the magnitudes of the other signals sensed by said sensor means from the same assembly during the same cycle, (d) on the observation that two signals depart in magnitude from the other signals by more than the allowable variation of the corresponding sensor means, determining which of said two signals departs by a greater magnitude from the average determined for the same sensor means during the previous cycle, (e) rejecting the signal of said two signals which departs most from said average, and (f) transmitting at least the other signals from which said two signals differ to control said apparatus.

12. The method of claim 11 including the steps of (a) comparing each of the other signals exclusive of the one rejected with each of the remaining of said other signals to determine if the remaining one of the two signals departs from the other signals by more than the allowable variation for said sensor means, and (b) rejecting said one signal if it departs from the remaining signals by more than said allowable variations.

13. The method of claim 11 wherein the number of sensor means is four.

14. The method of claim 12 wherein the one of the two signals is rejected if it departs by more than the allowable limit from at least two of the other signals.

15. Apparatus for supplying electrical power including a nuclear reactor, a plurality of components, connected to said reactor, for converting the thermal energy generated by said reactor into electrical power, a plurality of sensor assemblies, connected to said reactor and to certain of said components, for sensing the process parameters of said reactor and of said certain components, each of said sensor assemblies including a plurality of like sensor means for sensing the process parameter which the sensor assembly of which said like sensor means is a part, is to sense, each of said like sensor means producing signals measuring the parameter sensed by said each of said sensor assemblies, a protection system including a plurality of like protection units, means, connecting a like sensor means of each sensor assembly to a corresponding protection unit, to impress on said protection unit the signal produced by said connected sensor means, protection apparatus, responsive to said protection system to produce an apparatus-protection operation only when more than one of said protection units receive signals from their corresponding sensor means indicating faulty operation of said reactor and/or of said certain components whose process parameters are sensed by said corresponding sensor means, a control system, means connecting said control system in controlling relationship with said reactor and with at least some at said certain components, a plurality of separate channels connected separately to each said protection unit and to said control system, for transmitting, to said control system, signals derived by each of said protection units from its corresponding sensor means, for actuating said control system to control the processes of said reactor and/or said components as aforesaid on the indication by said signals impressed on said control system of off-normal operation of said reactor and/or said components, signals being transmitted from the sensor means, each in its turn, of sensor assemblies, each assembly in its turn, during successive transmitting cycles, each of said channels including optical means only to transmit the signals from its corresponding protection unit to said control system and to prevent electrical interaction between said protection units and said control system, and signal-selection means, interposed between said channels and said control system, operating by the comparison of each signal from the sensor means of a sensor assembly with the other signals from the sensor means of said assembly, each in its turn, and responsive to such comparison, preventing the transmission, to said control system from said protection units, of signals from a sensor means of a sensor assembly which signals differ significantly from signals from like sensor means of the same sensor assembly, the signals from each sensor means which do not differ significantly from signals from like sensor means of the same assembly being herein designated as "valid signals", the said signal-selection means including means for determining the differences between each signal sensed by each sensor means and the signals sensed by the other like sensor means of a sensor assembly during each said cycle, the said signal selection means also including means for comparing the signals sensed during a later cycle with the valid signals sensed during a preceding cycle in the event that the number of like sensor means, whose signals differ significantly from signals from other like sensor means, is equal to one-half of the total number of sensor means of the sensor assembly so that determination of which signals are valid is not practicable.

16. The method of operating apparatus for supplying electrical power, said apparatus including a nuclear reactor and a plurality of components connected to said reactor for converting the thermal energy generated by said reactor into electrical power, said reactor and certain of said components having parameters depending on their operational processes, a protection system, protection apparatus, responsive to said protection system, for producing a protection operation when said process-dependent parameters indicate off-normal operation of said apparatus exceeding a predetermined margin, and a control system for controlling said apparatus responsive to the magnitude of said process-dependent parameters, the said method comprising producing each of a plurality of process signals, each set measuring one of said parameters, transmitting each of said sets of process signals to said protection system for separate processing by said protection system, causing said protection system to actuate said protective apparatus responsive only to more than one process signal of a set measuring a parameter indicating off-normal operation of the apparatus exceeding said margin, separately deriving from said protection system each set of process signals measuring each of said parameters, during successive cycles determining for the parameters, each parameter in its turn, the differences between each process signal of a set measuring a parameter in its turn and each of the other process signals of the set measuring the same parameter to identify during each cycle which signals of a set differ from the other signals of said set by at least a predetermined magnitude which is equal to twice the allowable variation of the process signals for said set, said differing signals being herein designated as false signals and said other signals being herein designated as valid signals, entering the valid signals for each set derived during each cycle, where the number of signals of a set which, during any cycle, differ from other signals of said set by at least said predetermined magnitude is equal to one-half the number of signals in the set comparing the signals of said last-named set with the valid signals for the same parameter entered during the preceding cycle to determine which signals of said last-named set are valid and which are false, suppressing the signals of said last-named set determined to be false by the said comparison, transmitting to said control system the signals of said set determined to be valid to said control system, and causing said control system, responsive to any derived process signal which it receives and which measures off-normal condition of a process within said margin, to control the reactor or component involved in said off-normal process so as to revert said process to normal condition.

* * * * *